US012579279B2

(12) United States Patent
Zawadowskiy et al.

(10) Patent No.:   US 12,579,279 B2
(45) Date of Patent:      Mar. 17, 2026

(54) SYSTEM AND METHOD FOR SUMMARIZATION OF COMPLEX CYBERSECURITY BEHAVIORAL ONTOLOGICAL GRAPH

(71) Applicant: Cisco Technology, Inc., San Jose, CA (US)

(72) Inventors: Andrew Zawadowskiy, Hollis, NH (US); Oleg Bessonov, San Jose, CA (US); Vincent Parla, North Hampton, NH (US)

(73) Assignee: Csico Technology, Inc., San Jose, CA (US)

( * ) Notice: Subject to any disclaimer, the term of this patent is extended or adjusted under 35 U.S.C. 154(b) by 286 days.

(21) Appl. No.: 18/360,648

(22) Filed: Jul. 27, 2023

(65) Prior Publication Data

US 2024/0330348 A1      Oct. 3, 2024

Related U.S. Application Data

(60) Provisional application No. 63/493,552, filed on Mar. 31, 2023.

(51) Int. Cl.
G06F 21/00        (2013.01)
G06F 11/34        (2006.01)
(Continued)

(52) U.S. Cl.
CPC ........ G06F 21/577 (2013.01); G06F 11/3476 (2013.01); G06F 16/334 (2019.01);
(Continued)

(58) Field of Classification Search
CPC ............. H04L 63/1433; H04L 63/1425; H04L 63/145; H04L 63/1483; H04L 63/1491;
(Continued)

(56) References Cited

U.S. PATENT DOCUMENTS 8,479,291 B1      7/2013 Bodke
2005/0071347 A1*   3/2005 Chau ..................... G06F 40/117
(Continued)

FOREIGN PATENT DOCUMENTS

WO          2022188066 A1      9/2022

OTHER PUBLICATIONS

Alrzini J., et al., A Review of Polymorphic Malware Detection Techniques, International Journal of Advanced Research in Engineering and Technology (IJARET), vol. 11, No. 12, Dec. 2020, pp. 1238-1247.
(Continued)

*Primary Examiner* — Michael M Lee
(74) *Attorney, Agent, or Firm* — Polsinelli P.C.

(57) ABSTRACT

A system and method are provided for explaining ontological sub-graphs. The system and method include querying an ontology to determine a match between a query graph and a portion of an ontology graph. When there is a match, a subgraph representing the match is first translated into a simple summary using a simple language (e.g., triplets which include a subject and object corresponding to pairs of connected nodes in the subgraph and a verb/predicate representing a relation/edge in the subgraph that connect the pair nodes). This simple summary is then fed, as part of a prompt, to a large language model (LLM) that generates a human-readable summary based on the prompt.

20 Claims, 9 Drawing Sheets

(51) Int. Cl.

| | |
|---|---|
| *G06F 16/334* | (2025.01) |
| *G06F 16/34* | (2019.01) |
| *G06F 16/901* | (2019.01) |
| *G06F 21/31* | (2013.01) |
| *G06F 21/55* | (2013.01) |
| *G06F 21/56* | (2013.01) |
| *G06F 21/57* | (2013.01) |
| *G06N 20/00* | (2019.01) |
| *H04L 9/40* | (2022.01) |

(52) U.S. Cl.
CPC ........ *G06F 16/345* (2019.01); *G06F 16/9024* (2019.01); *G06F 21/31* (2013.01); *G06F 21/552* (2013.01); *G06F 21/563* (2013.01); *G06F 21/566* (2013.01); *G06N 20/00* (2019.01); *H04L 63/1425* (2013.01); *H04L 63/1433* (2013.01); *H04L 63/145* (2013.01); *H04L 63/1483* (2013.01); *H04L 63/1491* (2013.01)

(58) Field of Classification Search
CPC .. G06F 11/3476; G06F 16/334; G06F 16/345; G06F 16/9024; G06F 21/31; G06F 21/552; G06F 21/563; G06F 21/577; G06F 21/566
See application file for complete search history.

(56) References Cited

U.S. PATENT DOCUMENTS

| | | | | |
|---|---|---|---|---|
| 2009/0031224 A1* | 1/2009 | Budreau | .............. | G06F 3/0482 |
| | | | | 715/760 |
| 2011/0078187 A1* | 3/2011 | Lim | ....................... | G06F 16/36 |
| | | | | 707/E17.014 |
| 2015/0378984 A1 | 12/2015 | Ateya et al. | | |
| 2016/0247087 A1 | 8/2016 | Nassar et al. | | |
| 2017/0075904 A1 | 3/2017 | Hedges | | |
| 2017/0193229 A1 | 7/2017 | Roychowdhury et al. | | |
| 2018/0004751 A1* | 1/2018 | Vikhe | ................... | G06F 16/248 |
| 2018/0069885 A1* | 3/2018 | Patterson | ................ | G06F 16/27 |
| 2018/0173372 A1* | 6/2018 | Greenspan | ......... | G06F 16/2465 |
| 2018/0205755 A1 | 7/2018 | Kavi et al. | | |
| 2018/0329958 A1 | 11/2018 | Choudhury et al. | | |
| 2019/0303498 A1 | 10/2019 | Saha et al. | | |
| 2020/0293656 A1 | 9/2020 | Lakhotia | | |
| 2020/0356675 A1 | 11/2020 | Shakarian et al. | | |
| 2021/0144154 A1 | 5/2021 | Levy | | |
| 2021/0294829 A1 | 9/2021 | Bender et al. | | |
| 2021/0312058 A1 | 10/2021 | Chiarelli et al. | | |
| 2021/0326436 A1* | 10/2021 | West | ..................... | G06F 21/567 |
| 2021/0342380 A1 | 11/2021 | Luus et al. | | |
| 2022/0004630 A1 | 1/2022 | Almukaynizi et al. | | |
| 2022/0004720 A1* | 1/2022 | Wu | ........................... | G06N 3/04 |
| 2022/0121964 A1 | 4/2022 | Ramakrishnan et al. | | |
| 2022/0138241 A1 | 5/2022 | Chen et al. | | |
| 2022/0156380 A1 | 5/2022 | Pradzynski et al. | | |
| 2022/0207152 A1 | 6/2022 | Bellis et al. | | |
| 2022/0342891 A1* | 10/2022 | Vale | ................... | G06F 16/90335 |
| 2023/0004559 A1 | 1/2023 | Kreutzer et al. | | |
| 2023/0019941 A1 | 1/2023 | Doyle et al. | | |
| 2023/0036159 A1 | 2/2023 | Duppils et al. | | |
| 2023/0086327 A1 | 3/2023 | Song et al. | | |
| 2023/0359825 A1* | 11/2023 | Ramsl | ..................... | G06N 5/022 |
| 2023/0419042 A1* | 12/2023 | Sabapathy | ............. | G06N 20/00 |
| 2024/0095241 A1* | 3/2024 | Zheng | ................. | G06F 16/9024 |
| 2024/0169218 A1* | 5/2024 | Lee | ..................... | G06Q 30/0203 |
| 2024/0296276 A1* | 9/2024 | Hattangady | ........... | H04L 51/216 |

OTHER PUBLICATIONS

Ainslie S., et al., "Cyber-threat Intelligence for Security Decision-making: A Review and Research Agenda for Practice," Science Direct, Computers & Security, vol. 132, Sep. 2023, pp. 1-16.
Rao D., "How to Use Large Language Models and Knowledge Graphs to Manage Enterprise Data", Venturebeat, Apr. 15, 2023, pp. 1-17.

\* cited by examiner

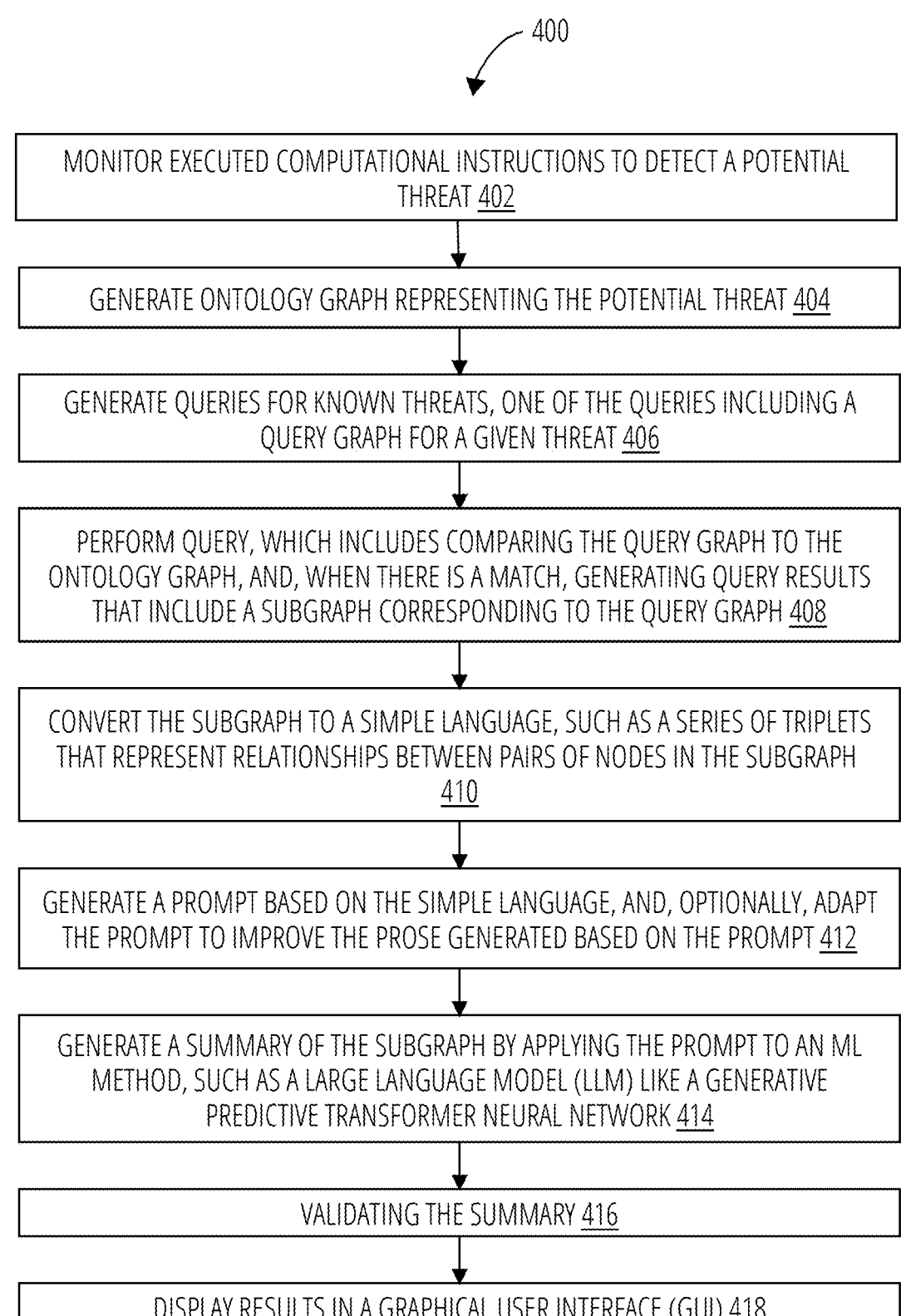

400

MONITOR EXECUTED COMPUTATIONAL INSTRUCTIONS TO DETECT A POTENTIAL THREAT 402

GENERATE ONTOLOGY GRAPH REPRESENTING THE POTENTIAL THREAT 404

GENERATE QUERIES FOR KNOWN THREATS, ONE OF THE QUERIES INCLUDING A QUERY GRAPH FOR A GIVEN THREAT 406

PERFORM QUERY, WHICH INCLUDES COMPARING THE QUERY GRAPH TO THE ONTOLOGY GRAPH, AND, WHEN THERE IS A MATCH, GENERATING QUERY RESULTS THAT INCLUDE A SUBGRAPH CORRESPONDING TO THE QUERY GRAPH 408

CONVERT THE SUBGRAPH TO A SIMPLE LANGUAGE, SUCH AS A SERIES OF TRIPLETS THAT REPRESENT RELATIONSHIPS BETWEEN PAIRS OF NODES IN THE SUBGRAPH 410

GENERATE A PROMPT BASED ON THE SIMPLE LANGUAGE, AND, OPTIONALLY, ADAPT THE PROMPT TO IMPROVE THE PROSE GENERATED BASED ON THE PROMPT 412

GENERATE A SUMMARY OF THE SUBGRAPH BY APPLYING THE PROMPT TO AN ML METHOD, SUCH AS A LARGE LANGUAGE MODEL (LLM) LIKE A GENERATIVE PREDICTIVE TRANSFORMER NEURAL NETWORK 414

VALIDATING THE SUMMARY 416

DISPLAY RESULTS IN A GRAPHICAL USER INTERFACE (GUI) 418

FIG. 4

ENCODE BLOCK <u>510a</u>

DECODE BLOCK <u>514a</u>

SYSTEM AND METHOD FOR SUMMARIZATION OF COMPLEX CYBERSECURITY BEHAVIORAL ONTOLOGICAL GRAPH

CROSS-REFERENCE TO RELATED APPLICATIONS

This application claims the benefit of priority to U.S. provisional application No. 63/493,552, filed on Mar. 31, 2023, which is expressly incorporated by reference herein in its entirety.

BACKGROUND

An increase in malicious attacks on networks gives rise to various challenges to ensure secure and effective communication between devices in a network. With increasing numbers of devices and access points on the network, comprehensive security strategies benefit from defenses at multiple layers of depth, with security layered across the network, the server, and the endpoints. Intrusion prevention systems can be employed to monitor a network for malicious or unwanted activity and can react, in real-time, to block, deny or prevent those activities.

Intrusion prevention systems, typically, network-based or host-based, employ automatically generated signatures to detect malicious attacks. Generally, conventional systems automatically generate anti-malware signatures by employing threat detection engines.

Once a threat has been detected, a security operations center (SOC) can be alerted to the threat. The SOC may receive a large volume of such notifications, which the SOC will then analyze and take remediating actions. Quickly and effectively communicating the threat to the SOC is important so that the SOC can efficiently analyze and address the large volume of notifications. Poor communication can lead to an increasing backlog of security alerts, which if left unaddressed present computer security risks. Many of the threat alerts can be false positives, but performing the analysis to discriminate the false positives from the true positives can consume significant resources and time. Accordingly, improved methods of summarizing threat alerts can reduce the burden of the SOC to quickly analyze the threats, and focus their energy on the most significant threats. Further effective communication can shorten the time for analysis by aiding the SOC in identifying and categorizing the issues presented by respective alerts.

For example, a graph of the threat may be used to communicate the threat. Graphs have the benefit that they can convey a large amount of information, and graphs are particularly well suited to represent the types of interactions typical of executed computer code. Graphs are sometimes used in cybersecurity to capture behavioral patterns for detection and analysis, and graphs are widely used in cybersecurity solutions. Graphs which include data from many sources are usually very large and have a huge number of nodes and edges. To simplify working with them, there are many specific queries, which reduce the graph to relevant interactions. But even after such reductions, the final graph results are hard to digest quickly by security analysts during investigations and solving open cases. Although graphs can be effective for conveying a large amount of information, graphs are not an intuitive mode of communication for many users. Accordingly, improved methods are desired to better communicate the information conveyed by graphs.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates a flow diagram for an example of a method for providing a text summary of the information conveyed by a graph related to a security alert, in accordance with certain embodiments.

DESCRIPTION OF EXAMPLE EMBODIMENTS

Figure 1:
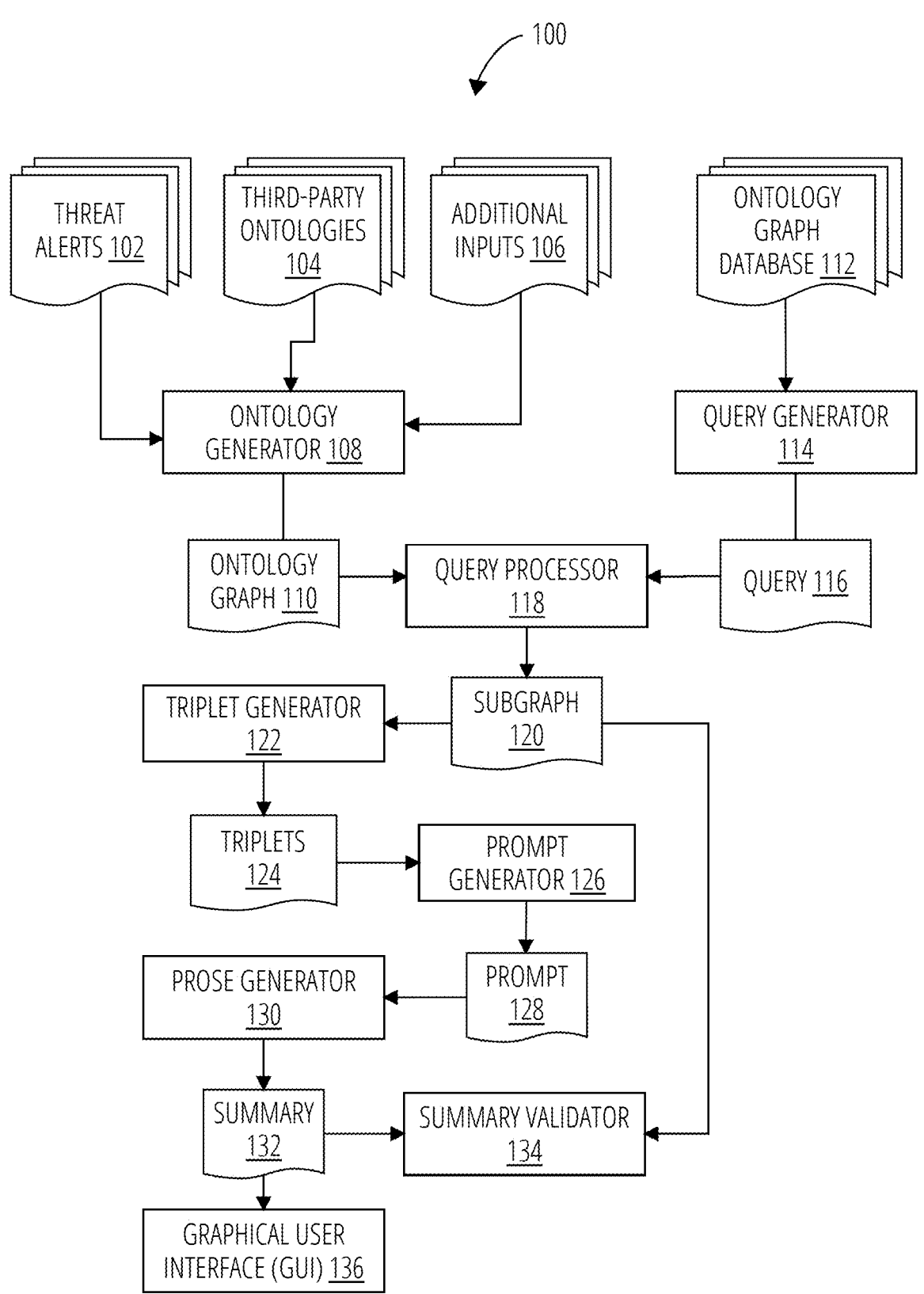
FIG. 1 illustrates a block diagram for an example of a system/device for providing a text summary of the information conveyed by a graph related to a security alert, in accordance with certain embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

In one aspect, a method is provided for explaining ontological sub-graphs. The method includes querying an ontology to determine a match between a query graph and a portion of an ontology graph, and generating, when the match is determined, a subgraph based on the match. The method further includes translating the subgraph to a first summary, and the method further includes generating a prompt based on the first summary. The method further includes applying the prompt to a machine learning (ML) method that generates a second summary of the subgraph.

In another aspect, the method may also include translating the subgraph to the first summary by translating the subgraph to a plurality of triplets, each triplet comprising three or more words that represent a relationship between a pair of nodes of the subgraph.

In another aspect, the method may also include validating the second summary by determining whether the semantic content of the second summary is consistent with the semantic content of the subgraph.

In another aspect, the method may also include validating the second summary by generating another graph based on the second summary; and comparing the another graph to the subgraph.

In another aspect, the method may also include determining information in the first summary that is less relevant than other information in the plurality of triplets; and adapting the prompt to omit the less relevant information from the second summary.

In another aspect, the method may also include adapting the prompt to include predefined instructions that are based on a type of security threat that is represented by the query graph.

In another aspect, the method may also include displaying, in a graphical user interface (GUI), an image of the subgraph; and displaying, in the GUI, text of the second summary.

In another aspect, the method may also include highlighting, in the GUI, a respective portion of the image of the subgraph when a corresponding portion of the text is selected; or highlighting, in the GUI, a respective portion of the text when a corresponding portion of the image of the subgraph is selected.

In another aspect, the method may also include associating respective portions of the subgraph with corresponding portions of the text.

In another aspect, the method may also include that the query graph represents a series of steps executed by malware.

In another aspect, the method may also include displaying, in a graphical user interface (GUI), a recommendation for an action responsive to the malware.

In another aspect, the method may also include adapting the prompt to constrain the ML method to increase the concision of the summary of the subgraph.

In another aspect, the method may also include that the triplets of the plurality of triplets are structured as sentences comprising a subject, an object, and a verb or predicate that relates the subject to the object.

In one aspect, a computing apparatus includes a processor. The computing apparatus also includes a memory storing instructions that, when executed by the processor, configure the apparatus to perform the respective steps of any one of the aspects of the above-recited methods.

In one aspect, a computing apparatus includes a processor. The computing apparatus also includes a memory storing instructions that, when executed by the processor, configure the apparatus to query an ontology to determine a match between a query graph and a portion of an ontology graph; generate, when the match is determined, a subgraph based on the match; translate the subgraph to a first summary;

generate a prompt based on the first summary; and apply the prompt to a machine learning (ML) method that generates a second summary of the subgraph.

In another aspect, when executed by the processor, the instructions stored in the memory cause the processor to translate the subgraph to the first summary by translating the subgraph to a plurality of triplets, each triplet comprising three or more words that represent a relationship between a pair of nodes of the subgraph.

In another aspect, when executed by the processor, the instructions stored in the memory cause the processor to validate the second summary by determining whether semantic content of the second summary is consistent with semantic content of the subgraph.

In another aspect, when executed by the processor, the instructions stored in the memory cause the processor to validate the second summary by: generating another graph based on the second summary; and comparing the another graph to the subgraph.

In another aspect, when executed by the processor, the instructions stored in the memory cause the processor to determine information in the first summary that is less relevant than other information in the plurality of triple; and adapt the prompt to omit the less relevant information from the second summary.

In another aspect, when executed by the processor, the instructions stored in the memory cause the processor to adapt the prompt to include predefined instructions that are based on a type of security threat that is represented by the query graph.

In another aspect, when executed by the processor, the instructions stored in the memory cause the processor to display, in a graphical user interface (GUI), an image of the subgraph; and display, in the GUI, text of the second summary.

In another aspect, when executed by the processor, the instructions stored in the memory cause the processor to highlight, in the GUI, a respective portion of the image of the subgraph when a corresponding portion of the text is selected; or highlight, in the GUI, a respective portion of the text when a corresponding portion of the image of the subgraph is selected.

In another aspect, when executed by the processor, the instructions stored in the memory cause the processor to associate respective portions of the subgraph with corresponding portions of the text.

In another aspect, the query graph represents a series of steps executed by malware.

In another aspect, when executed by the processor, the instructions stored in the memory cause the processor to display, in a graphical user interface (GUI), a recommendation for an action responsive to the malware.

In another aspect, when executed by the processor, the instructions stored in the memory cause the processor to adapt the prompt to constrain the ML method to increase the concision of the summary of the subgraph.

In another aspect, when executed by the processor, the instructions stored in the memory cause the processor to generate a query that is used in querying the ontology based on graphs of malware in a threat grid.

In another aspect, the ML method comprises a transformer neural network.

In one aspect, a non-transitory computer-readable storage medium is provided for explaining ontological sub-graphs. The computer-readable storage medium includes instructions that when executed by a computer, cause the computer to: query an ontology to determine a match between a query graph and a portion of an ontology graph; generate, when the match is determined, a subgraph based on the match; translate the subgraph to a first summary; generate a prompt based on the first summary; and apply the prompt to a machine learning (ML) method that generates a second summary of the subgraph.

In another aspect, when executed by the computer, the instructions stored in the computer-readable storage medium cause the processor to: translate the subgraph to the first summary by translating the subgraph to a plurality of triplets, each triplet comprising three or more words that represent a relationship between a pair of nodes of the subgraph.

In another aspect, when executed by the computer, the instructions stored in the computer-readable storage medium cause the processor to: validate the second summary by determining whether semantic content of the second summary is consistent with semantic content of the subgraph.

In another aspect, when executed by the computer, the instructions stored in the computer-readable storage medium cause the processor to: validate the second summary by: generating another graph based on the second summary; and comparing the another graph to the subgraph.

In another aspect, when executed by the computer, the instructions stored in the computer-readable storage medium cause the processor to: determine information in the first summary that is less relevant than other information in the plurality of triple; and adapt the prompt to omit the less relevant information from the second summary.

In another aspect, when executed by the computer, the instructions stored in the computer-readable storage medium cause the processor to: include predefined instructions that are based on a type of security threat that is represented by the query graph.

In another aspect, when executed by the computer, the instructions stored in the computer-readable storage medium cause the processor to: display, in a graphical user interface (GUI), an image of the subgraph; and display, in the GUI, text of the second summary.

In another aspect, when executed by the computer, the instructions stored in the computer-readable storage medium cause the processor to: highlight, in the GUI, a respective portion of the image of the subgraph when a corresponding portion of the text is selected; or highlight, in the GUI, a respective portion of the text when a corresponding portion of the image of the subgraph is selected.

In another aspect, when executed by the computer, the instructions stored in the computer-readable storage medium cause the processor to: associate respective portions of the subgraph with corresponding portions of the text.

In another aspect, the query graph represents a series of steps executed by malware.

In another aspect, when executed by the computer, the instructions stored in the computer-readable storage medium cause the processor to: display, in a graphical user interface (GUI), a recommendation for an action responsive to the malware.

In another aspect, when executed by the computer, the instructions stored in the computer-readable storage medium cause the processor to: adapt the prompt to constrain the ML method to increase the concision of the summary of the subgraph.

In another aspect, when executed by the computer, the instructions stored in the computer-readable storage medium cause the processor to: generate a query that is used in querying the ontology based on graphs of malware in a threat grid.

EXAMPLE EMBODIMENTS

Additional features and advantages of the disclosure will be set forth in the description which follows, and in part will be apparent from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for improved methods of communicating the information represented in a graph and for improved methods of communicating the information in a security alert. More particularly, the disclosed technology addresses the need for more comprehensible summaries of the information conveyed in graphs generated as part of a threat alert for a cyber attack.

Once a threat has been detected, a security operations center (SOC) can be alerted to the threat. The SOC may receive a large volume of such notifications, which are analyzed and addressed. Improved methods of summarizing threat alerts can reduce the burden of the SOC to quickly analyze the threats.

For example, a graph of the threat may be used to communicate the threat. Graphs can effectively convey a large amount of information regarding complex relationships for a security threat. Graphs are frequently used in cybersecurity to capture behavioral patterns for detection and analysis.

Graphs that include data from many sources are usually very large and have a huge number of nodes and edges, making them challenging to comprehend. To simplify working with the graphs, various queries can be used to analyze the graph and to reduce the graph to relevant interactions. But even after such reductions, the final reduced graph can still be hard to digest quickly by security analysts in the course of their investigations of cybersecurity threats. The information represented information by a graph can be non-intuitive, making it time-consuming to analyze and comprehend.

The methods and systems disclosed herein provide additional summarization of the threats by converting the reduced graph to a written summary of the threat. The written summary of the threat is human-readable text that can provide security analysts with a more intuitive, readily understood mechanism than the reduced graph itself. The written summary can be generated by first converting the reduced graph to a simple language, and then converting the simple language to a prompt that is applied to a large language model (LLM) such as CHATGPT. Then, based on the prompt, the LLM generates the written summary.

Additionally, the methods and systems disclosed herein provide querying the graph to detect threats (i.e., the methods and system can serve as a threat detector). If the graph matchs a pattern associated with a threat, then an attack happened or is likely to have happened. Thus, threats can be detected using the methods described herein.

Figure 3A:
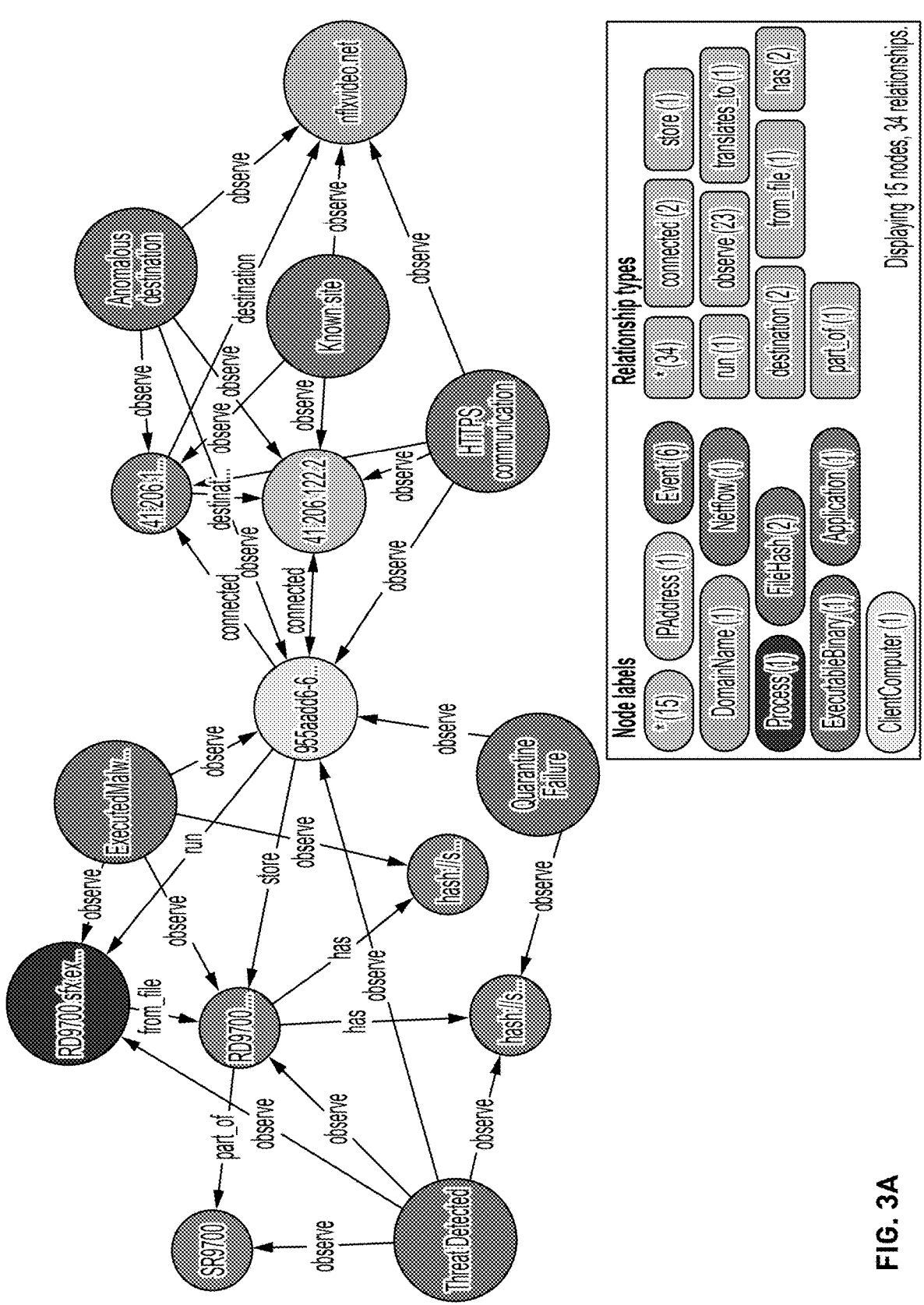
FIG. 3A illustrates an example of an ontology graph, in accordance with certain embodiments.
Figure 3B:
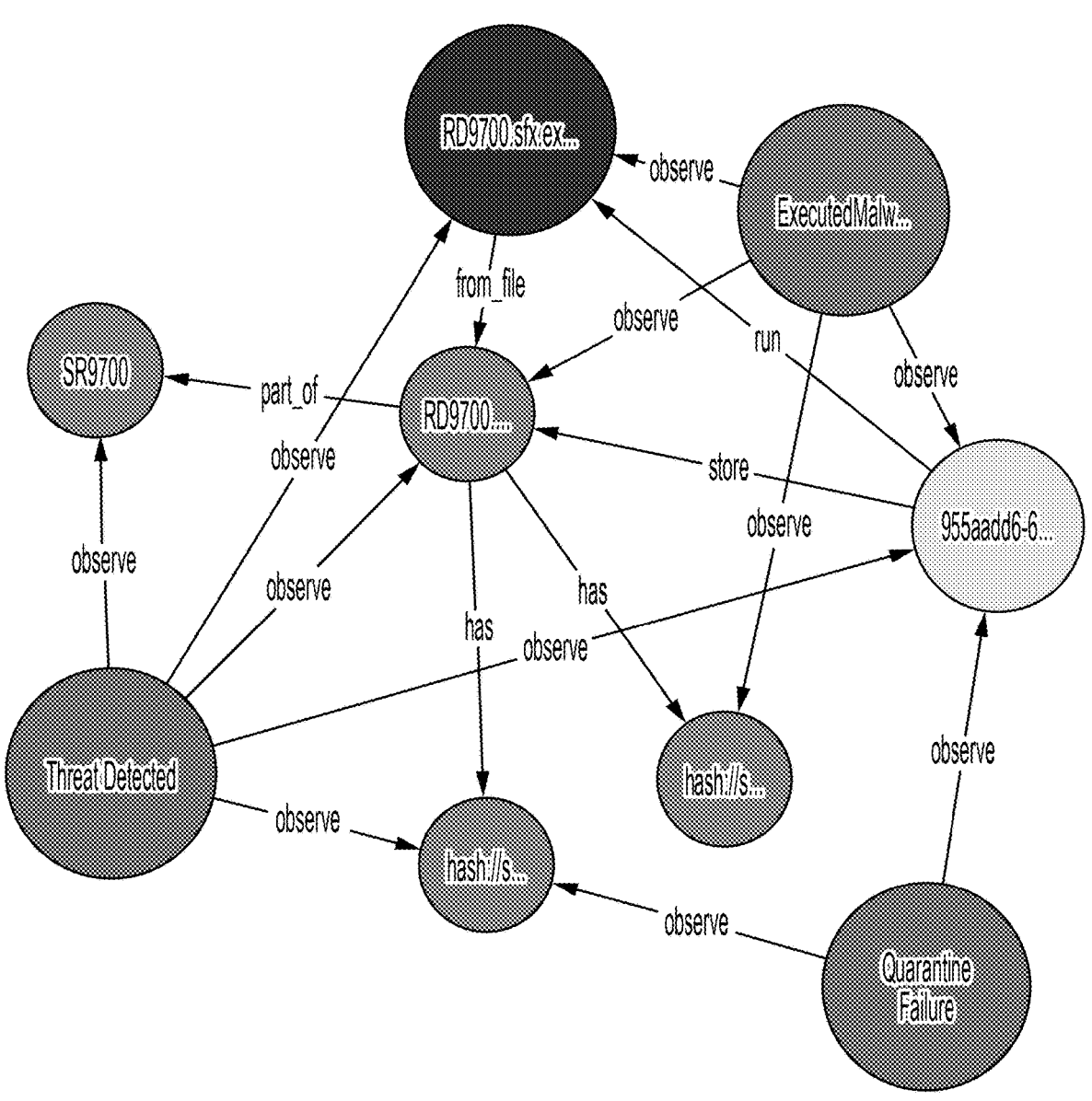
FIG. 3B illustrates a zoomed-in portion of the ontology graph, in accordance with certain embodiments.

FIG. 1 shows an example of an ontology summary system 100 that generates prose summarizing the security incident giving rise to a threat alert. The ontology summary system 100 has an ontology generator 108 that receives various inputs, including, e.g., a threat alerts 102, a third-party ontologies 104, an additional inputs 106. Based on these inputs, the ontology generator 108 creates an ontology graph 110 that represents various relations between entities of computational instructions that have been executed by a computer/processor. These entities can include files, executable binary, processes, domain names, IP addresses, etc., as illustrated in FIG. 3A and FIG. 3B. These Figures illustrate examples of graphs representing an ontology as a series of vertices/nodes connected by directed edges.

The ontology summary system 100 also has a query generator 114 that creates a query 116 based on values from an ontology graph database 112, which stores graphs/patterns that represent respective malicious behaviors. The query 116 includes a query graph that is compared to various portions of the ontology graph 110 by the query processor 118. This comparison can be based on the topology (e.g., the spatial relations) and content (e.g., values of the vertices/ nodes and relations expressed by the edges). When a match is found, the portion of the ontology graph 110 that matches the query graph is returned as the subgraph 120.

The remainder of the ontology summary system 100 provides a summary 132 of the subgraph, and then validates the summary and displays it in a graphical user interface (GUI) 136. First, the triplet generator 122 converts the subgraph 120 into a simple language. In FIG. 1, the simple language is illustrated by the triplets 124. For example, each pair of connected nodes in the subgraph 120 express a relation that can typically be expressed as a three-part sentence (e.g., a triplet) that includes a subject, verb/predicate, and object, with the subject being the node originating the directed edge, the verb being relation represented by the directed edge, and the object being the node to which the edge is directed. As discussed below, the simple language can be triplets 124, such as the Resource Description Framework (RDF) triplets, one example of such RDF triplets is a turtle language.

Figure 5A:
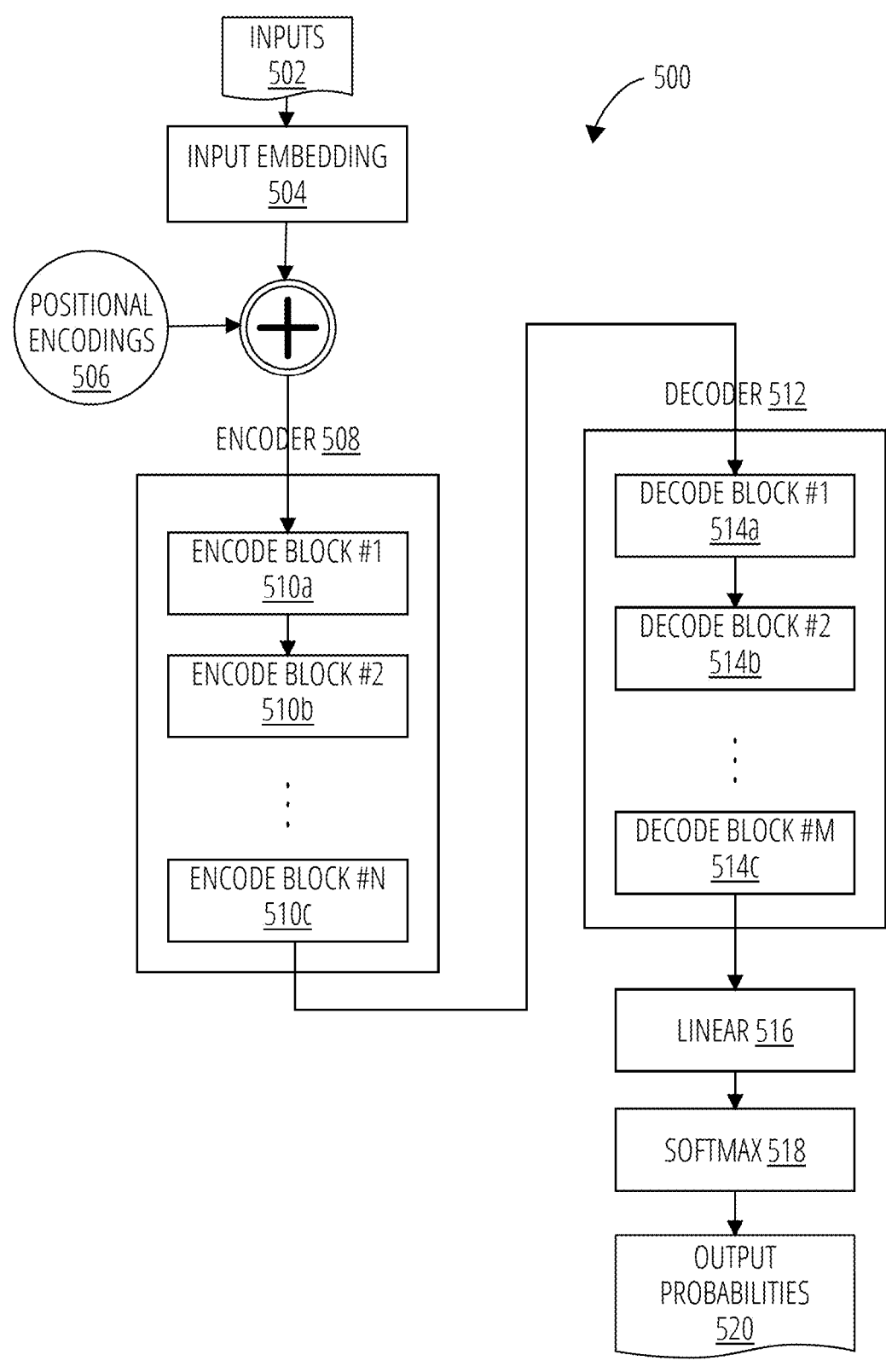
FIG. 5A illustrates a block diagram for an example of a transformer neural network architecture, in accordance with certain embodiments.

Using the triplets 124, a prompt generator 126 then generates a prompt for the prose generator 130. The prompt 128 directs the prose generator 130 regarding the substance (e.g., the triplets 124) and style of the summary 132 to be created by the prose generator 130. The prose generator 130 can be a large language model (LLM) such CHATGPT, for example. As illustrated in FIG. 5A, discussed below, the prose generator 130 can use a transformer architecture 500, such as a Generative Pre-trained Transformer (GPT) model. Additionally or alternatively, the prose generator 130 can include a Bidirectional Encoder Representations from Transformers (BERT) model. The triplets 124 tend to be short and choppy sentences that are limited to relations between pairs of nodes. The prose generator 130 can expand these simple relations into sentences that each capture and summarize the information conveyed in multiple triples. For example, the prose sentences can express more complex relationships between three or more nodes, thereby making broader connections that help security analysts more quickly comprehend the information expressed by the subgraph 120. Thus, a security analyst can more quickly assess the threat alerts 102.

The summary validator 134 checks the summary 132 to determine whether the summary is consistent with the subgraph 120, thereby ensuring that important aspects of the subgraph were not lost or misinterpreted in the translation from the subgraph 120 to the summary 132. For example, a machine learning (ML) method can convert the summary back to a graph that is compared to the subgraph 120 to determine whether features of the subgraph have been preserved.

Additionally, the summary 132 can be displayed in the GUI 136. The GUI 136 can include both the text of the summary 132 and a visual representation of the subgraph 120. The subgraph 120 provides ground truth, and the summary 132 provides a more easily comprehended mechanism for understanding the subgraph 120. According to certain non-limiting examples, a user can select a portion of the text of the summary 132, and in response the GUI 136 highlights a corresponding portion of the subgraph associated with the selected text. Thus, starting from the text of the summary, a security analyst can quickly find the relevant features in the subgraph 120 that correspond to portions of the text of the summary. Then referring to the corresponding region of the subgraph 120, the security analyst can verify that, for the relevant features, the relations expressed in the text are consistent with the corresponding region of the subgraph 120, thereby confirming a correct understanding of the threat.

Figure 2:
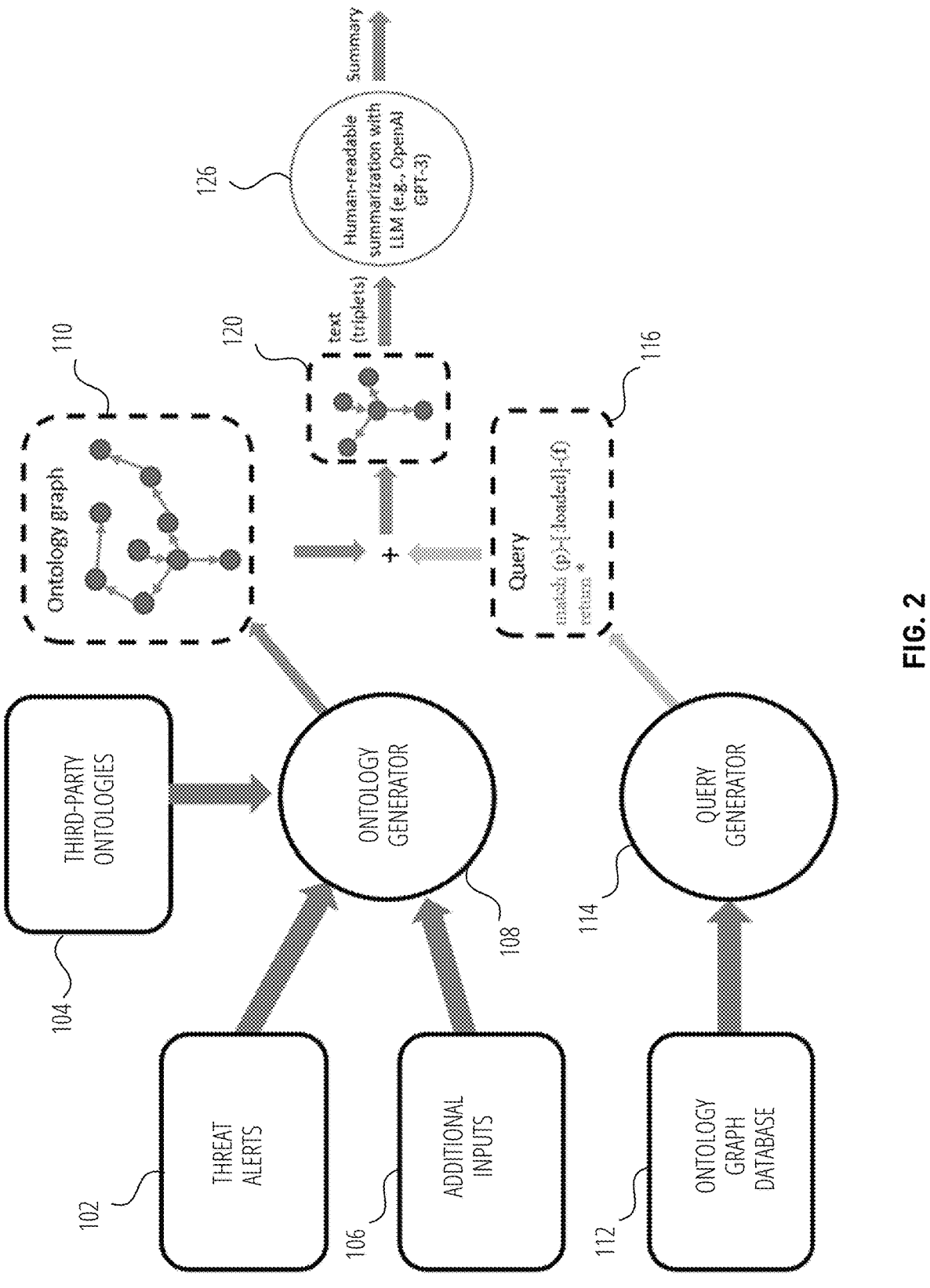
FIG. 2 illustrates a block diagram for another example of a system/device for providing a text summary of the information conveyed by the graph related to the security alert, in accordance with certain embodiments.

FIG. 2 illustrates a non-limiting example of the ontology summary system 100. The threat alerts 102 combines several data sources, which are then provided to the ontology generator 108.

The ontology generator 108 also receives inputs from the third-party ontologies 104 and additional inputs 106.

Using these various inputs, the ontology generator 108 generates the ontology graph 110. Generally, a cybersecurity ontology is used to describe cybersecurity concepts and relationships between concepts in a cybersecurity field or even a wider range. These concepts and relationships have a common, unambiguous, and unique definition that is agreed on in the shared range.

The ontology generator 108 also generated the query 116 based on the ontology graph database 112. When the query is performed and a match (e.g., an exact match or a partial match) is found, the query returns the subgraph 120, which is a portion of the ontology graph 110 that matches the query graph.

According to certain non-limiting examples, the ontology generator 108 uses a well-defined ontology, which defines cybersecurity concepts and relations between them, where concepts correspond to nodes and relations correspond to edges and loads such data in the graph database. The ontology generator 108 is used to execute a query. This query produces a reduced graph (i.e., the subgraph 120), which is usually much smaller than the ontology graph, but can still be hard to comprehend quickly as it uses many specific cybersecurity terms and often low-level concepts like fork, inject, mutex, etc.

Then the subgraph 120 is converted to text, which can be a series of triplets of the form subject->predicate->object. For example, the subgraph 120 can be converted to text using Resource Description Framework (RDF) triplets. RDF enables statements about resources. The format of these statements is simple. A statement always has the following structure:

<subject><predicate><object>

An RDF statement expresses a relationship between two resources. The subject and the object represent the two resources being related; the predicate represents the nature of their relationship. The relationship is phrased in a directional way (from subject to object) and is called in RDF a property. Because RDF statements consist of three elements they are called triplets.

FIG. 3A and FIG. 3B show examples of cybersecurity graphs. The nodes include cybersecurity concepts, such as command line calls, registries, processes, executable binary, applications, network flow, mutual exclusion (mutex) calls, atoms, and files. The directed edges include relationship types, such as fork, has, read, modified, created, part of, deleted, opened, etc. FIG. 3B is representative of a graph representing the ontology itself, and FIG. 3A is representative of a graph representing data after the ontology has been applied to the data.

The relationship between the nodes in FIG. 3A can be expressed in a simplified triplet language. For example, the relation between the top two nodes can be expressed by the triplet<process b463f7382fcb4 . . . ><created><atom Ole-Drop . . . >. The relation between each connected pair of nodes can be similarly summarized with a corresponding triplet. But this simplified language is still challenging to quickly understand. For example, a collection of RDF triplets statements might be something like: "Process A made DNS request. Process A created file F. Process A connected to host H. Process A downloaded a file from host H. Process A forked process B. Process B is from file F. Process A opened listen unix socket. Process B connected to process A over unix socket."

To make the summary more comprehensible, these triplet statements can be fed to an LLM via a prompt, resulting in a summary such as: "Downloaded process B communicating with parent process A over unix sockets."

FIG. 4 illustrates an example summarization method 400 for generating a summary of the threat alert. Although the example summarization method 400 depicts a particular sequence of operations, the sequence may be altered without departing from the scope of the present disclosure. For example, some of the operations depicted may be performed in parallel or in a different sequence that does not materially affect the function of the summarization method 400. In other examples, different components of an example device or system that implements the summarization method 400 may perform functions at substantially the same time or in a specific sequence.

According to some examples, in step 402, the summarization method 400 includes monitoring executed computational instructions to detect a potential threat.

According to some examples, in step 404, an ontology graph is generated. The ontology graph represents the potential threat of the executed computational instructions.

According to some examples, in step 406, queries are generated for known threats. One of the queries includes a query graph for the threat. As discussed above, the query graph represents entities at the respective nodes of the query graph, and the edges of the query graph represent relations between pairs of nodes. Thus, the query graph represents a pattern that indicates a cyber-security threat.

According to some examples, in step 408, the query is performed. For example, the query includes comparing the query graph to the ontology graph. For example, the query can be performed by traversing the nodes of the ontology graph to compare whether the query graph is isomorphic with respective subgraphs connecting to the traversed nodes of the ontology graph. In certain non-limiting examples, a positive match is determined when the subgraph and the query graph have a degree of isomorphism that exceeds a predefined threshold (e.g., greater than 90% isomorphism. Further, in certain non-limiting examples, the comparison includes comparing whether the nodes represent the same type of entity and the edges represent the same type of relation. That is, the comparison can include both a topological comparison and a content/representation comparison (i.e., the meaning of the nodes and edges).

When there is a match, query results are generated. The query results include a subgraph corresponding to the query graph.

According to some examples, in step 410, the method includes the subgraph being converted to a simple language. For example, the simple language can be a series of triplets that represent relationships between pairs of nodes in the subgraph 120. In certain non-limiting examples, each pair of connected nodes in the subgraph 120 expresses a relation that can be expressed as a three-part sentence (e.g., a triplet) that includes a subject, verb/predicate, and object, with the subject being the node originating the directed edge, the verb/predicate being relation represented by the directed edge, and the object being the node to which the edge is directed. One example of such a simple language that can be derived from a graph is the Resource Description Framework (RDF) triplets.

According to some examples, in step 412, method 400 includes generating a prompt based on the simple language from step 410. For example, the prompt may include an instruction to "summarize or explain the following text" with the following text being the text of the simplified language. In certain non-limiting examples, the prompt is adapted to improve the prose generated in step 414 based on the prompt. For example, the prompt may include an instruction to summarize the text at a predefined level (e.g., at an eighth-grade level) or to emphasize the security risks. For example, different query graphs used in respective queries will correspond to different security threats. And each query can trigger a predefined set of questions or instructions to be included in the prompt. The predefined set of questions or instructions can be tailored to ensure the more relevant information for that type of security threat is included in the summary. Consider that, the MITRE ATT&CK framework includes 14 tactics, 185 techniques, and 367 sub-techniques. Each of these or various subsets of these may be the subject of a query. For example, a query can be performed for the combination of technique T1055 process injection with the tactic of defense evasion, privilege escalation. For this combination of technique and tactic(s), a set of predefined instructions can be defined to be included in the prompt that ensures the summary includes and highlights relevant details, and these instructions can instruct the LLM to include the most relevant information first. Thus, the security analyst will be able to quickly understand the threat and categorize/prioritize the threat accordingly.

According to some examples, in step 414, the method includes generating a summary of the subgraph by applying the prompt to an ML method, such as a large language model (LLM) like a generative predictive transformer neural network.

According to some examples, in step 416, the method validates the summary. For example, the summary can be translated to another graph, which is then compared to the subgraph to ensure that the summary is consistent with the subgraph, as discussed above. In certain non-limiting examples, validation can be performed using a causal reasoning engine or other machine learning method that evaluates whether the semantic meaning of the summary is consistent with that of the subgraph. In certain non-limiting examples, validation is enabled by providing access to a graphical user interface (GUI) that includes a visual representation of the subgraph. Because the subgraph is ground truth, a security analyst can confirm the accuracy of the summary by referring back to the respective portion of the subgraph corresponding to a portion of text in the summary, as discussed above.

According to some examples, in step 418, the method includes displaying results in a GUI. The GUI can include both the text of the summary and a visual representation of the subgraph. The subgraph provides ground truth, and the summary provides a more easily comprehended mechanism for understanding the subgraph. According to certain non-limiting examples, a user can select a portion of the text of the summary 132, and, in response, the GUI highlights a corresponding portion of the subgraph associated with the selected text. Thus, starting from the text of the summary, a security analyst can quickly find the relevant features in the subgraph that correspond to portions of the text of the summary. Then referring to the corresponding region of the subgraph, the security analyst can verify that, for the relevant features, the relations expressed in the text are consistent with the corresponding region of the subgraph, thereby confirming a correct understanding of the threat.

Figure 5B:
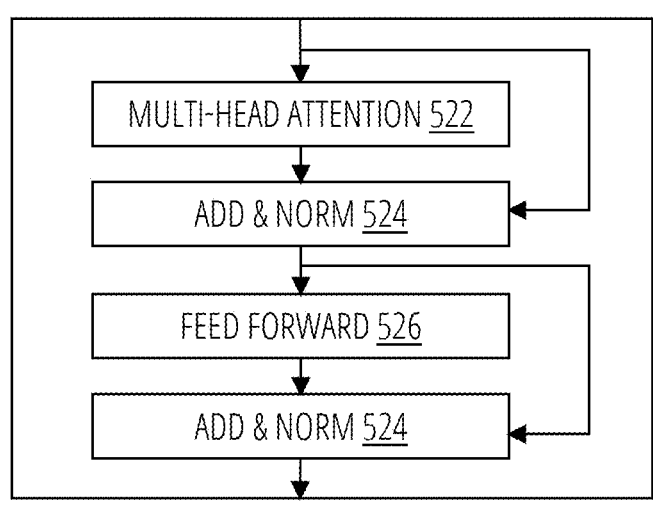
FIG. 5B illustrates a block diagram for an example of an encoder of the transformer neural network architecture, in accordance with certain embodiments.
Figure 5C:
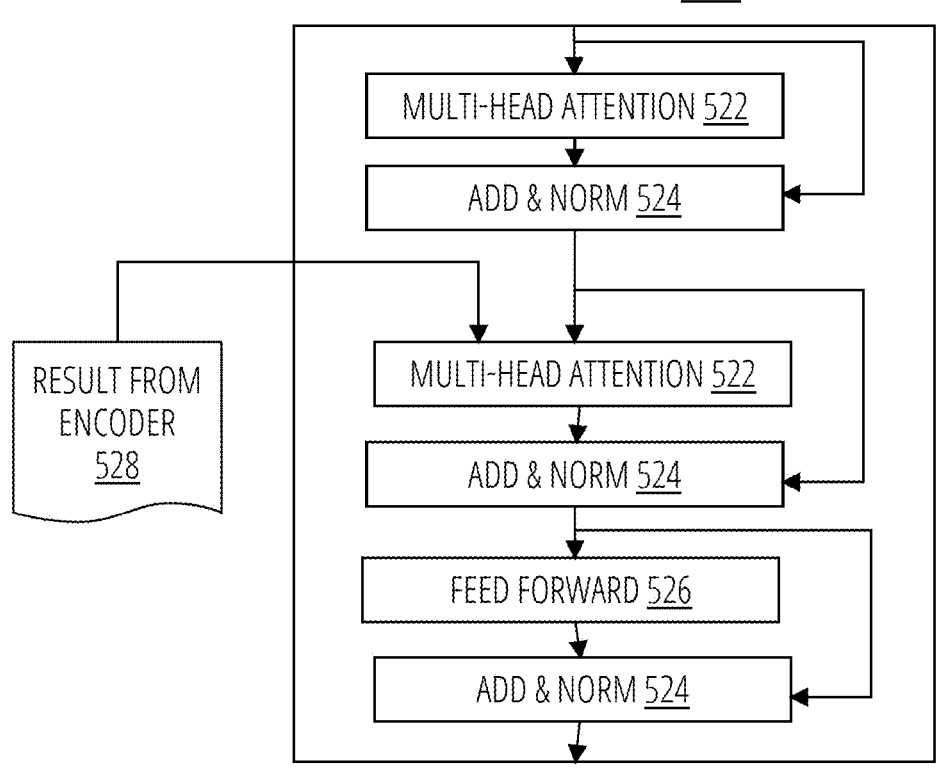
FIG. 5C illustrates a block diagram for an example of a decoder of the transformer neural network architecture, in accordance with certain embodiments.

As discussed above, the prose generator 130 can use a transformer architecture 500, such as a Generative Pre-trained Transformer (GPT) model. Additionally or alternatively, the prose generator 130 can include a Bidirectional Encoder Representations from Transformers (BERT) model. According to certain non-limiting examples, the transformer architecture 500 is illustrated in FIG. 5A through FIG. 5C as including inputs 502, an input embedding block 504, positional encodings 506, an encoder 508 (e.g., encode blocks 410a, 410b, and 510c), a decoder 512 (e.g., decode blocks 514a, 514b, and 514c), a linear block 516, a softmax block 518, and output probabilities 520.

The input embedding block 504 is used to provide representations for words. For example, embedding can be used in text analysis. According to certain non-limiting examples, the representation is a real-valued vector that encodes the meaning of the word in such a way that words that are closer in the vector space are expected to be similar in meaning. Word embeddings can be obtained using language modeling and feature learning techniques, where words or phrases from the vocabulary are mapped to vectors of real numbers. According to certain non-limiting examples, the input embedding block 504 can be learned embeddings to convert the input tokens and output tokens to vectors of dimension that have the same dimension as the positional encodings, for example.

The positional encodings 506 provide information about the relative or absolute position of the tokens in the sequence. According to certain non-limiting examples, the positional encodings 506 can be provided by adding positional encodings to the input embeddings at the inputs to the encoder 508 and decoder 512. The positional encodings have the same dimension as the embeddings, thereby enabling a summing of the embeddings with the positional encodings. There are several ways to realize the positional encodings, including learned and fixed. For example, sine and cosine functions having different frequencies can be used. That is, each dimension of the positional encoding corresponds to a sinusoid. Other techniques of conveying positional information can also be used, as would be understood by a person of ordinary skill in the art. For example, learned positional embeddings can instead be used to obtain similar results. An advantage of using sinusoidal positional encodings rather than learned positional encodings is that so doing allows the model to extrapolate to sequence lengths longer than the ones encountered during training.

The encoder 508 uses stacked self-attention and point-wise, fully connected layers. The encoder 508 can be a stack of N identical layers (e.g., N=6), and each layer is an encode block 410, as illustrated by encode block 510a shown in FIG. 5B. Each encode block 410 has two sub-layers: (i) a first sub-layer has a multi-head attention block 522 and (ii) a second sub-layer has a feed forward block 526, which can be a position-wise fully connected feed-forward network. The feed forward block 526 can use a rectified linear unit (ReLU).

The encoder 508 uses a residual connection around each of the two sub-layers, followed by an add & norm block 524, which performs normalization (e.g., the output of each sub-layer is LayerNorm(x+Sublayer(x)), i.e., the product of a layer normalization "LayerNorm" time the sum of the input "x" and output "Sublayer(x)" pf the sublayer Layer-Norm(x+Sublayer(x)), where Sublayer(x) is the function implemented by the sub-layer). To facilitate these residual connections, all sub-layers in the model, as well as the embedding layers, produce output data having a same dimension.

Similar to the encoder 508, the decoder 512 uses stacked self-attention and point-wise, fully connected layers. The decoder 512 can also be a stack of M identical layers (e.g., M=6), and each layer is a decode block 414, as illustrated by encode decode block 514a shown in FIG. 5C. In addition to the two sub-layers (i.e., the sublayer with the multi-head attention block 522 and the sub-layer with the feed forward block 526) found in the encode block 510a, the decode block 514a can include a third sub-layer, which performs multi-head attention over the output of the encoder stack. Similar to the encoder 508, the decoder 512 uses residual connections around each of the sub-layers, followed by layer normalization. Additionally, the sub-layer with the multi-head attention block 522 can be modified in the decoder stack to prevent positions from attending to subsequent positions. This masking, combined with fact that the output embeddings are offset by one position, ensures that the predictions for position i can depend only on the known output data at positions less than i.

The linear block 516 can be a learned linear transformation. For example, when the transformer architecture 500 is being used to translate from a first language into a second language, the linear block 516 projects the output from the last decode block 514c into word scores for the second language (e.g., a score value for each unique word in the target vocabulary) at each position in the sentence. For instance, if the output sentence has seven words and the provided vocabulary for the second language has 10,000 unique words, then 10,000 score values are generated for each of those seven words. The score values indicate the likelihood of occurrence for each word in the vocabulary in that position of the sentence.

The softmax block 518 then turns the scores from the linear block 516 into output probabilities 520 (which add up to 1.0). In each position, the index provides for the word with the highest probability, and then map that index to the corresponding word in the vocabulary. Those words then form the output sequence of the transformer architecture 500. The softmax operation is applied to the output from the linear block 516 to convert the raw numbers into the output probabilities 520 (e.g., token probabilities), which are used in the process of generating the summary 132 based on the prompt 128

Figure 6A:
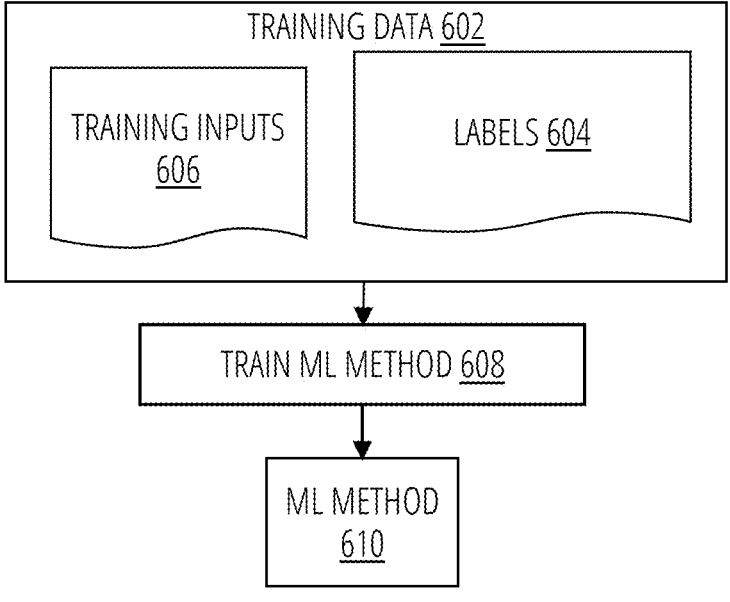
FIG. 6A illustrates a flow diagram for an example of a method of training a neural network, in accordance with certain embodiments.

FIG. 6A illustrates an example of training an ML method 610 (e.g., the ontology generator 108 or the query processor 118). In step 608, training data 602, which includes the labels 604 and the training inputs 606) is applied to train the ML method 610. For example, the ML method 610 can be an artificial neural network (ANN) that is trained via supervised learning using a backpropagation technique to train the weighting parameters between nodes within respective layers of the ANN. In supervised learning, the training data 602 is applied as an input to the ML method 610, and an error/loss function is generated by comparing the output from the ML method 610 with the labels 604. The coefficients of the ML method 610 are iteratively updated to reduce an error/loss function. The value of the error/loss function decreases as outputs from the ML method 610 increasingly approximate the labels 604. In other words, ANN infers the mapping implied by the training data, and the error/loss function produces an error value related to the mismatch between the labels 604 and the outputs from the ML method 610 that are produced as a result of applying the training inputs 606 to the ML method 610.

For example, in certain implementations, the cost function can use the mean-squared error to minimize the average squared error. In the case of a of multilayer perceptrons (MLP) neural network, the backpropagation algorithm can be used for training the network by minimizing the mean-squared-error-based cost function using a gradient descent method.

Training a neural network model essentially means selecting one model from the set of allowed models (or, in a Bayesian framework, determining a distribution over the set of allowed models) that minimizes the cost criterion (i.e., the error value calculated using the error/loss function). Generally, the ANN can be trained using any of numerous algorithms for training neural network models (e.g., by applying optimization theory and statistical estimation).

For example, the optimization method used in training artificial neural networks can use some form of gradient descent, using backpropagation to compute the actual gradients. This is done by taking the derivative of the cost function with respect to the network parameters and then changing those parameters in a gradient-related direction. The backpropagation training algorithm can be: a steepest descent method (e.g., with variable learning rate, with variable learning rate and momentum, and resilient backpropagation), a quasi-Newton method (e.g., Broyden-Fletcher-Goldfarb-Shannon, one step secant, and Levenberg-Marquardt), or a conjugate gradient method (e.g., Fletcher-Reeves update, Polak-Ribiére update, Powell-Beale restart, and scaled conjugate gradient). Additionally, evolutionary methods, such as gene expression programming, simulated annealing, expectation-maximization, nonparametric methods and particle swarm optimization, can also be used for training the ML method 610.

The training 608 of the ML method 610 can also include various techniques to prevent overfitting to the training data 602 and for validating the trained ML method 610. For example, bootstrapping and random sampling of the training data 602 can be used during training.

In addition to supervised learning used to initially train the ML method 610, the ML method 610 can be continuously trained while being used by using reinforcement learning based on the network measurements and the corresponding configurations used on the network. The ML method 610 can be cloud based and can be trained using network measurements and the corresponding configurations from other networks that provide feedback to the cloud.

Further, other machine learning (ML) algorithms can be used for the ML method 610, and the ML method 610 is not limited to being an ANN. For example, there are many machine-learning models, and the ML method 610 can be based on machine learning systems that include generative adversarial networks (GANs) that are trained, for example, using pairs of network measurements and their corresponding optimized configurations.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 6B:
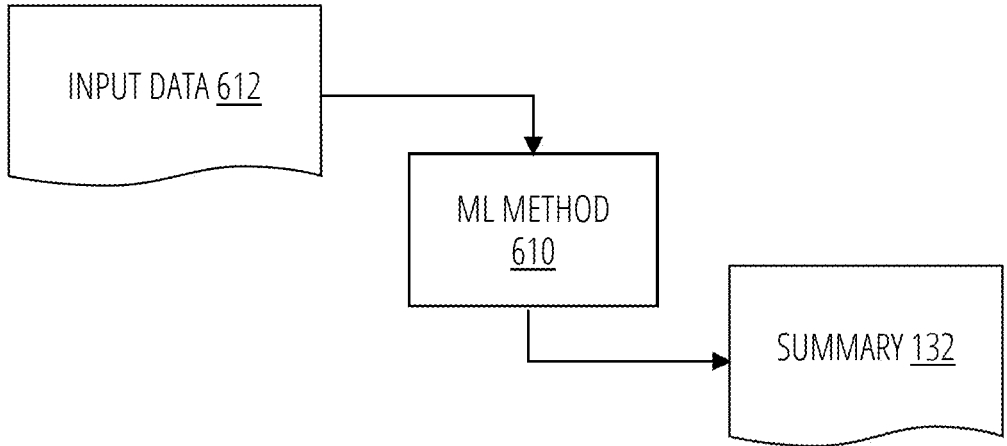
FIG. 6B illustrates a flow diagram for an example of a method of using the trained neural network, in accordance with certain embodiments.

FIG. 6B illustrates an example of using the trained ML method 610. The input data 612 are applied to the trained ML method 610 to generate the outputs, which can include the summary 132.

Figure 7:
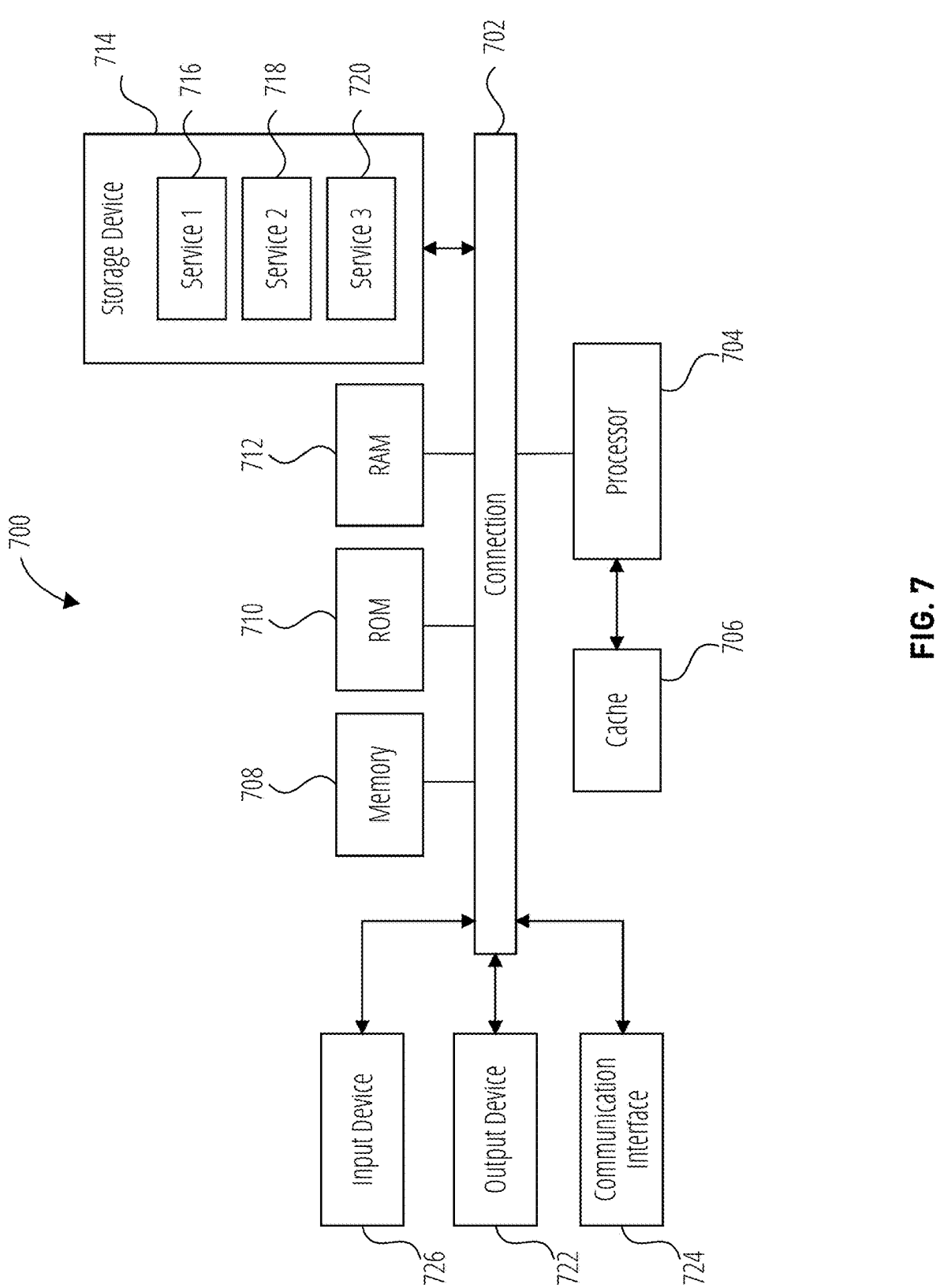
FIG. 7 illustrates a block diagram for an example of a computing device, in accordance with certain embodiments.

FIG. 7 shows an example of computing system 700, which can be for example any computing device configured to perform one or more of the steps of summarization method 400; any computing device making up the ontology summary system 100; or any component thereof in which the components of the system are in communication with each other using connection 702. Connection 702 can be a physical connection via a bus, or a direct connection into processor 704, such as in a chipset architecture. Connection 702 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 700 includes at least one processing unit (CPU or processor) 704 and connection 702 that couples various system components including system memory 708, such as read-only memory (ROM) 610 and random access memory (RAM) 612 to processor 704. Computing system 700 can include a cache of high-speed memory 706 connected directly with, in close proximity to, or integrated as part of processor 704.

Processor 704 can include any general purpose processor and a hardware service or software service, such as services 716, 718, and 720 stored in storage device 714, configured to control processor 704 as well as a special-purpose processor where software instructions are incorporated into the actual processor design. Processor 704 may essentially be a completely self-contained computing system, containing multiple cores or processors, a bus, memory controller, cache, etc. A multi-core processor may be symmetric or asymmetric.

To enable user interaction, computing system 700 includes an input device 726, which can represent any number of input mechanisms, such as a microphone for speech, a touch-sensitive screen for gesture or graphical input, a keyboard, a mouse, or a motion input. Computing system 700 can also include an output device 722, which can be one or more of a number of output mechanisms known to those of skill in the art. In some instances, multimodal systems can enable a user to provide multiple types of input/output to communicate with computing system 700. Computing system 700 can include a communication interface 624, which can generally govern and manage the user input and system output. There is no restriction on operating on any particular hardware arrangement, and therefore the basic features here may easily be substituted for improved hardware or firmware arrangements as they are developed.

Storage device 714 can be a non-volatile memory device and can be a hard disk or other types of computer-readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 714 can include software services, servers, services, etc., that use the processor 704 to execute code causing the system to perform a function, wherein the executed code is defined by software to perform the function. In some embodiments, a hardware service that performs a particular function can include the software component stored in a computer-readable medium in connection with the necessary hardware components, such as processor 704, connection 702, output device 722, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of an ontology summary system 100 and perform one or more functions of the summarization method 400 when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of explaining ontological sub-graphs, the method comprising:
monitoring executed computational instructions to detect a potential threat;
generating a cybersecurity ontology graph representing the potential threat;
generating one or more query graphs for known threats;
querying an ontology by comparing the cybersecurity ontology graph to the one or more query graphs to determine a match, wherein the cybersecurity ontology graph is at least partially not human readable;
generating, when the match is determined, a subgraph based on the match;
translating, without using machine learning (ML), the subgraph to a first summary;
generating a prompt based on the first summary; and
applying the prompt to a machine learning method that generates a second summary of the subgraph, wherein the second summary of the subgraph is human readable.

2. The method of claim 1, wherein translating the subgraph to the first summary comprises translating the subgraph to a plurality of triplets, each triplet comprising three or more words that represent a relation between a pair of nodes of the subgraph.

3. The method of claim 2, wherein:
triplets of the plurality of triplets are structured as sentences comprising a subject, an object, and a verb or predicate that relates the subject to the object.

4. The method of claim 1, further comprising validating the second summary by determining whether semantic content of the second summary is consistent with semantic content of the subgraph.

5. The method of claim 4, further comprising validating the second summary by:
generating another graph based on the second summary; and
comparing the another graph to the subgraph.

6. The method of claim 1, further comprising:
determining information in the first summary that is less relevant than other information in the first summary; and
adapting the prompt to omit the less relevant information from the second summary.

7. The method of claim 1, further comprising:
adapting the prompt to include predefined instructions that are based on a type of security threat that is represented by the one or more query graphs.

8. The method of claim 1, further comprising:
displaying, in a graphical user interface (GUI), an image of the subgraph; and
displaying, in the GUI, text of the second summary.

9. The method of claim 8, further comprising:
associating respective portions of the subgraph with corresponding portions of the text.

10. The method of claim 8, further comprising:
highlighting, in the GUI, a respective portion of the image of the subgraph when a corresponding portion of the text is selected; or
highlighting, in the GUI, a respective portion of the text when a corresponding portion of the image of the subgraph is selected.

11. The method of claim 1, wherein:
the one or more query graphs represents a series of steps executed by malware.

12. The method of claim 11, further comprising:
displaying, in a graphical user interface (GUI), a recommendation for an action responsive to the malware.

13. The method of claim 1, further comprising:
adapting the prompt to constrain the ML method to increase a concision of the second summary.

14. The method of claim 1, further comprising:
generating a query that is used in querying the ontology based on graphs of malware in a threat grid.

15. The method of claim 1, wherein:
the ML method comprises a transformer neural network.

16. A computing apparatus comprising:
a processor; and
a memory storing instructions that, when executed by the processor, configure the apparatus to:
monitor executed computational instructions to detect a potential threat;
generate a cybersecurity ontology graph representing the potential threat;
generate one or more query graphs for known threats;
query an ontology by comparing the cybersecurity ontology graph to the one or more query graphs to determine a match, wherein the cybersecurity ontology graph is at least partially not human readable;
generate, when the match is determined, a subgraph based on the match;
translate, without using machine learning (ML), the subgraph to a first summary;
generate a prompt based on the first summary; and
apply the prompt to a machine learning-(ML) method that generates a second summary of the subgraph, wherein the second summary of the subgraph is human readable.

17. The computing apparatus of claim 16, comprising further instructions which when executed by the processor, configure the apparatus to:
translate the subgraph to the first summary by translating the subgraph to a plurality of triplets, each triplet comprising three or more words that represent a relation between a pair of nodes of the subgraph.

18. The computing apparatus of claim 16, comprising further instructions which when executed by the processor, configure the apparatus to:

display, in a graphical user interface (GUI), an image of the subgraph;

display, in the GUI, text of the second summary; and highlighting, in the GUI, a respective portion of the image of the subgraph when a corresponding portion of the text is selected, or highlighting, in the GUI, a respective portion of the text when a corresponding portion of the image of the subgraph is selected.

19. The computing apparatus of claim 16, comprising further instructions which when executed by the processor, configure the apparatus to:

adapt the prompt to include predefined instructions that are based on a type of security threat that is represented by the query graph.

20. A non-transitory computer-readable storage medium, the computer-readable storage medium including instructions that when executed by a computer, cause the computer to:

monitor executed computational instructions to detect a potential threat;

generate a cybersecurity ontology graph representing the potential threat;

generate one or more query graphs for known threats;

query an ontology by comparing the cybersecurity ontology graph to the one or more query graphs to determine a match, wherein the cybersecurity ontology graph is at least partially not human readable;

generate, when the match is determined, a subgraph based on the match;

translate, without using machine learning (ML), the subgraph to a first summary;

generate a prompt based on the first summary; and apply the prompt to a machine learning method that generates a second summary of the subgraph, wherein the second summary of the subgraph is human readable.

\* \* \* \* \*